United States Patent
Karanja et al.

[11] Patent Number: 6,148,206
[45] Date of Patent: Nov. 14, 2000

[54] METHOD FOR CONCEALING A HANDOVER MUTE

[75] Inventors: Martin T. Karanja, Margate; Nader Rizq, Plantation, both of Fla.; Scott D. Gleason, Auzeville-Tolosane, France

[73] Assignee: Motorola, Inc., Schaumburg, Ill.

[21] Appl. No.: 09/212,672

[22] Filed: Dec. 16, 1998

[51] Int. Cl.[7] .................................................. H04Q 7/20
[52] U.S. Cl. .......................... 455/436; 455/439; 455/442
[58] Field of Search .................................. 455/436, 439, 455/442, 522, 307; 375/363, 244; 704/210, 215, 248, 253

[56] References Cited

U.S. PATENT DOCUMENTS

| | | | |
|---|---|---|---|
| 4,761,829 | 8/1988 | Lynk, Jr. et al. | 455/307 |
| 5,063,597 | 11/1991 | Seo et al. | 704/226 |
| 5,146,609 | 9/1992 | Tayloe et al. | 455/436 |
| 5,488,649 | 1/1996 | Schellinger | 340/825.34 |
| 5,594,799 | 1/1997 | Herrmann | 381/13 |
| 5,594,946 | 1/1997 | Menich et al. | 455/522 |
| 5,666,366 | 9/1997 | Malek et al. | 370/505 |
| 5,799,039 | 8/1998 | Laird et al. | 375/244 |
| 5,802,076 | 9/1998 | Weigand et al. | 714/747 |
| 5,822,313 | 10/1998 | Malek et al. | 370/332 |

FOREIGN PATENT DOCUMENTS

WO 98/09454  3/1998  WIPO ............................ H04Q 7/22

*Primary Examiner*—Nay Maung
*Assistant Examiner*—Sonny Trinh
*Attorney, Agent, or Firm*—Scott M. Garrett

[57] ABSTRACT

In a mobile communication system (400) where a handover results in a momentary interruption of a signal between the mobile communication device (402) and the fixed network equipment(404, 410), the effect of muted portion (306) of the signal can be reduced by storing a segment (308) of the signal that is received just prior to the occurrence of the handover, and re-using the stored segment by attenuating the segment, playing the segment, and repeating the attenuating and playing (208, 210) until the handover is complete.

5 Claims, 5 Drawing Sheets

METHOD FOR CONCEALING A HANDOVER MUTE

TECHNICAL FIELD

This invention relates in general to mobile communication systems, and particularly to systems where the audio signal is muted during the occurrence of a handover between serving areas.

BACKGROUND OF THE INVENTION

Mobile communication systems are in widespread use, and there is strong competition among service providers, particularly in metropolitan areas. There are a variety of factors which influence consumers when making a decision as to which service provider to use. Influential factors include serving area, service costs, quality of service, additional features, and so on. Of these factors, the quality of service is one of the more important.

Quality of service refers to the quality of the reproduction of the received audio signal. There are a number of things which determine audio quality, such as the audio circuit design of the mobile communication device, the resistance to channel impairments of the RF signal between the mobile communication device and a base station, and introduced noise derived from the communication system.

Noise from the system can occur during call setup, but is most prevalent during a handover, where communication between the mobile communication device and the fixed network equipment transfers from one base station to another. The ability to transfer communication links from base station to base station is what makes the communication system a mobile communication system. However, a handoff event produce a disruption in the received signal. Typically, the received signal is briefly interrupted as the mobile communication device trains to the frequency of the base station to which it is transferring. To the listener, the received signal is muted during the handoff. Since the user of the device is typically unaware of the handoff event, the muted portion may be perceived as a problem with the communication service. Therefore, there is a need for a means by which the muting of the received signal can be perceptually reduced.

DETAILED DESCRIPTION OF A PREFERRED EMBODIMENTS

Figure 1:
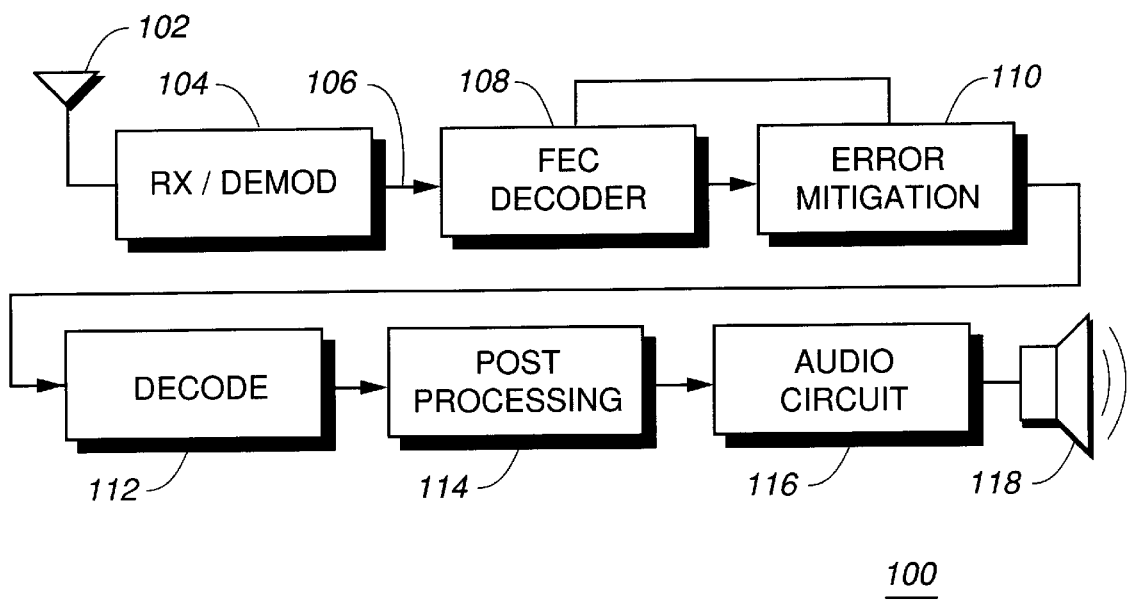
FIG. 1 shows a block diagram of the receive path of a mobile communication device capable of practicing the present method invention.

While the specification concludes with claims defining the features of the invention that are regarded as novel, it is believed that the invention will be better understood from a consideration of the following description in conjunction with the drawing figures, in which like reference numerals are carried forward.

The present invention addresses the problem of muted interruptions in a received signal during a handover by using a segment or segments of speech received just prior to the occurrence of the handover, and re-playing them in a way that sounds natural. This takes advantage of the fact that, while perceptible, the time it takes to complete a handover is typically less than the time in which a given speech characteristic will significantly change.

Since a handover mute will be perceived as resulting from the mobile communication system, system operators have the most interest in reducing or eliminating the perceptibility of a handover event. Perhaps the easiest place to address the problem is in a mobile communication device. Referring now to FIG. 1, there is shown a block diagram 100 of the receive path of a mobile communication device capable of practicing the present method invention. The communication device may be, for example, a digital cellular telephone. Generically, the mobile communication device is a radio, and receives signals at radio frequencies. In the instant example the radio is a digital radio, and receives a digital radio signal via an antenna 102. Coupled to the antenna is a receiver/demodulator 104, which demodulates the received signal to provides a digital signal 106. The digital signal may comprise a digitally encoded audio or voice signal, or simply a digitized audio signal. However, the signal is usually coded for forward error correction (FEC), and must be decoded by an FEC decoder 108.

Conventionally, if the FEC decoder is unable to decode a segment of information, the FEC decoder will invoke an error mitigation function 110. The error mitigation function stores a recent segment of the digital signal coming from the FEC decoder, and preferably the last segment of the digital audio signal. Normally, when the received signal cannot be decoded by the FEC decoder, it means that part of the signal has been corrupted. This could be from noise or some other channel impairment. Rather than process corrupted data, the error mitigation function takes the stored segment, reduces or otherwise attenuates it, and sends the attenuated segment instead of the corrupted one. The error mitigation function repeats the attenuate routine until non-corrupted data is received, or until the stored segment has been reduced to a level sufficiently low that it could not be heard. By reducing the or attenuating the segment, it is meant that the energy or the magnitude, or both, of the segment is reduced uniformly. This can be done, for example, for digitized signals, by processing the segment with a fast Fourier transform (FFT), and reducing the magnitude of each discrete frequency, then performing an inverse FFT. A more preferable means of performing the attenuation can be accomplished in systems using voice encoded signals, as is described hereinbelow.

After the error mitigation function, the data may be acted on by a voice decoder 112, if the data is digitally encoded audio. In many digital communication systems the audio signal, and more specifically, the voice signal, is encoded by, for example vector sum excited linear predictive coding (VSELP). In VSELP, the audio or speech information is reduced to a set of symbols representing portions of speech, along with a variety of parameters to color the speech, including a frame energy parameter. The encoding achieves compression, and therefore reduces the amount of data that needs to be transmitted. The encoded audio information is converted to a digitized audio segment by the voice decoder 112, which may be further filtered during post processing 114, and is then fed to an audio circuit 116. The audio circuit comprises a digital to analog converter and an audio amplifier. The digitized audio segments are converted to an analog audio signal, amplified, and played over a speaker 118. The whole process performed by the audio circuit and speaker is referred to as playing the audio signal.

When the received signal is a digitally encoded audio signal, such as a VSELP signal, the FFT method referred to hereinabove is not employed. Rather, since the frame energy is one of the parameters in the VSELP signal, the frame energy can be reduced by the error mitigation function to achieve the desired attenuation effect. Each time the attenuate procedure is used during the handover, the error mitigation function reduces the frame energy parameter. The frame energy parameter is used by the voice decoder to decode the segments at the correct signal level. An alternative means for attenuating is to multiply the samples resulting from the decoding process by a predetermined scaling factor that is less than one.

In the preferred embodiment the FEC decoder, error mitigation, voice decoding, and post processing are performed by a digital signal processor (DSP), in accordance with software executed by the DSP. The DSP may be, for example, a DSP56000 which is manufactured by Motorola Inc. It is further contemplated that a portion of the demodulation may be handled by the DSP. Accordingly, the blocks shown here represent functions performed by the DSP, and each function is called by supervisory software, as it is required, to process the received data as it is received. It is conventional in many digital communication systems to receive data in segments at regular intervals, and process each segment as it is received.

Figure 2:
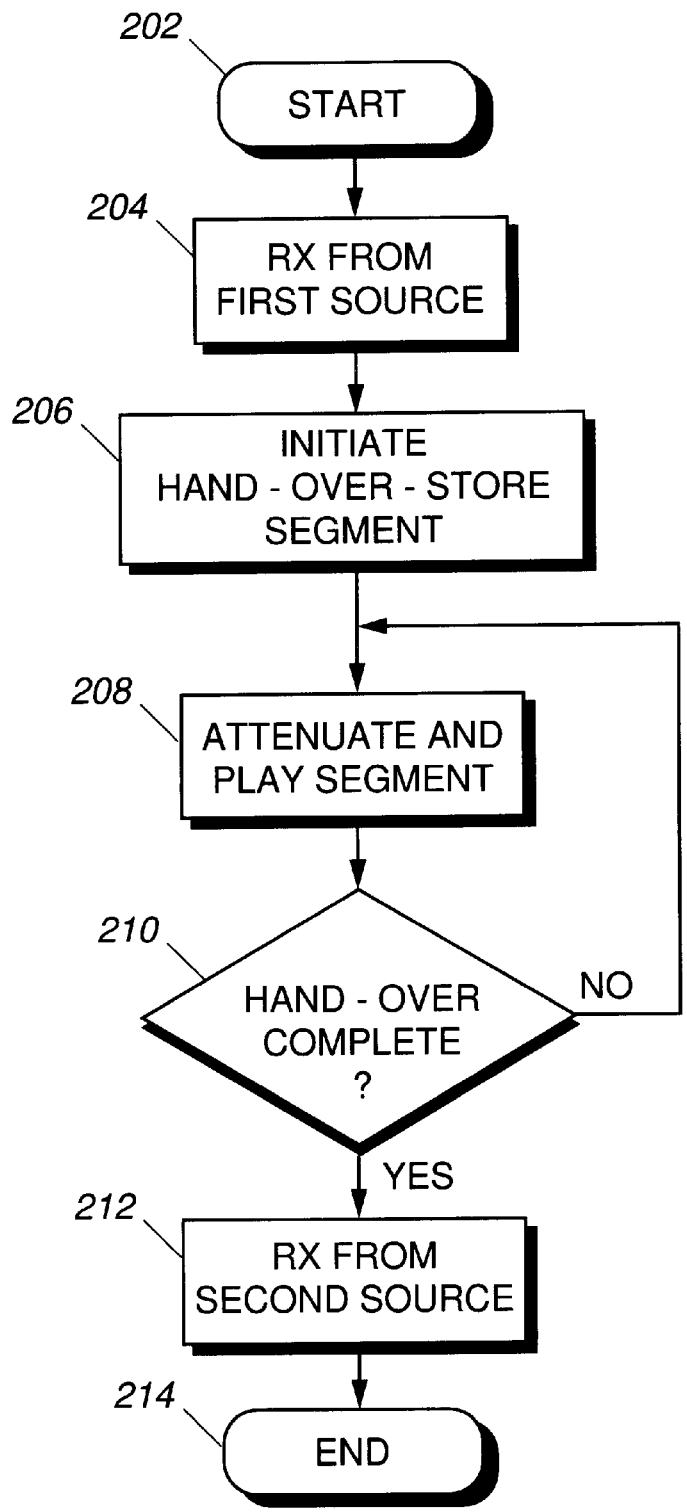
FIG. 2 shows a flow chart diagram of a method in accordance with the present invention.

In FIG. 2 there is shown a flow chart diagram 200 of the generic process of performing the invention. Referring now to FIG. 2, at the start 202 the communication system is ready to receive and process a signal. The mobile communication device is located in a first serving cell, as is conventional in the art. The fixed network equipment, including base stations, and the mobile communication device initiate a call so that data is transmitted from one to the other . Accordingly, the receiving equipment, either the fixed network or the mobile device, begins receiving, demodulating, decoding, and so on (204). At some point (206) the mobile equipment reaches a handover point, and needs to have service handed over to a second serving cell. Just prior to the handover, the receiving equipment stores the last segment received from the transmitting equipment. Subsequently, while the service is switched from the first serving cell to the second serving cell, the attenuate, play, and repeat process (208) is performed using the stored segment of data. The process of 208 is repeated until the handover is complete (210), and the receiving equipment continues the communication by receiving from the second serving cell (212), and the process ends (214).

Figure 3:
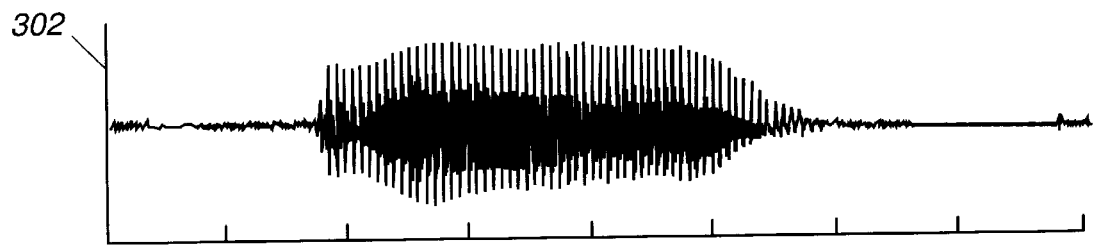
FIG. 3 shows a series of graphs illustrating the effect of the present invention on a received voice signal.
Figure 3:
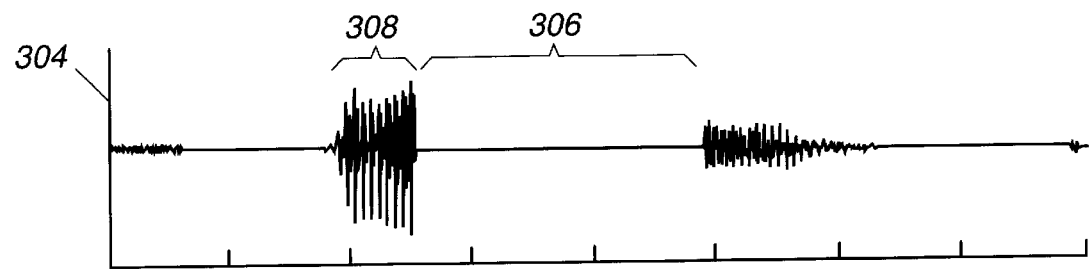
Figure 3:
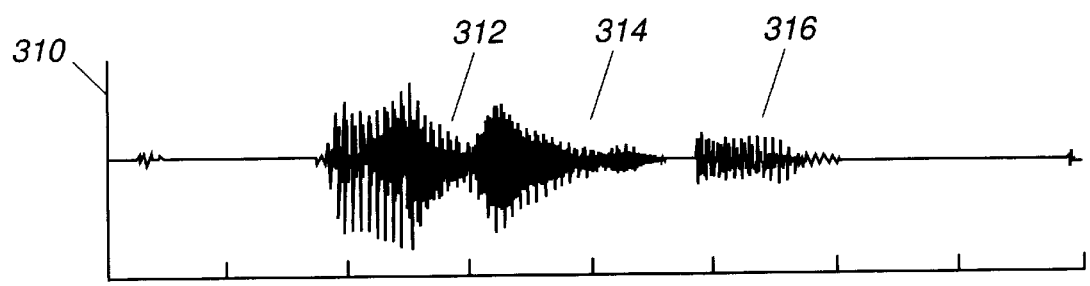

Using prior art handover methods, during the occurrence of the handover, between blocks 206 and 212, the audio is muted. This is referred to as a handover mute. The handover mute typically lasts on the order of 100–200 milliseconds, but is perceptible to the listener, and may be distracting. By using the present invention, the handover mute can be substantially concealed, without any significant loss of information. FIG. 3 shows this in more detail.

Referring now to FIG. 3, there is shown a series of graphs 300 representing audio information received over time. The first graph 302 represents the original audio information, such as speech, and is about 200 milliseconds of information. It could represent a spoken word or a portion of a word, for example. The second graph 304 shows how the original information of the first graph could appear at the receiving equipment, including the effect of mitigating a handover mute 306. Without more, the muting results in the listener not hearing the majority of the word or portion of the word originally spoken by the other party. According to the invention, however, the last segment of the digital audio signal representing the portion 308 prior to the occurrence of the handover is stored. In the third graph 310, the effect of the invention is shown. During the occurrence of the handover mute, the attenuate, play, repeat method is used to fill in the muted time period, as indicated by segments 312 and 314. At the end of the handover, the receiving equipment begins receiving from the second serving cell, as indicated by segment 316, which is the same as the corresponding portion of the second graph.

In general, one embodiment of the method invention comprises first receiving a digitally encoded audio signal from a first serving cell. At some point while receiving the signal, and assuming the communication device is moving from a first serving cell to a second serving cell, the system begins initiating a handover from the first serving cell to the second serving cell. Immediately prior to the loss of communication with the first serving cell the communication device performs storing the last segment of the digitally encoded audio signal. The handover itself comprises disconnecting from the first serving cell and subsequently connecting to the second serving cell. This is not done instantaneously as it requires the mobile communication device to re-tune to the frequency of the second serving cell. Finally, while performing the disconnecting and connecting, and during an interim time therebetween, the mobile communication device proceeds in engaging an error mitigation function using the last segment of the digitally encoded audio signal.

Figure 4:
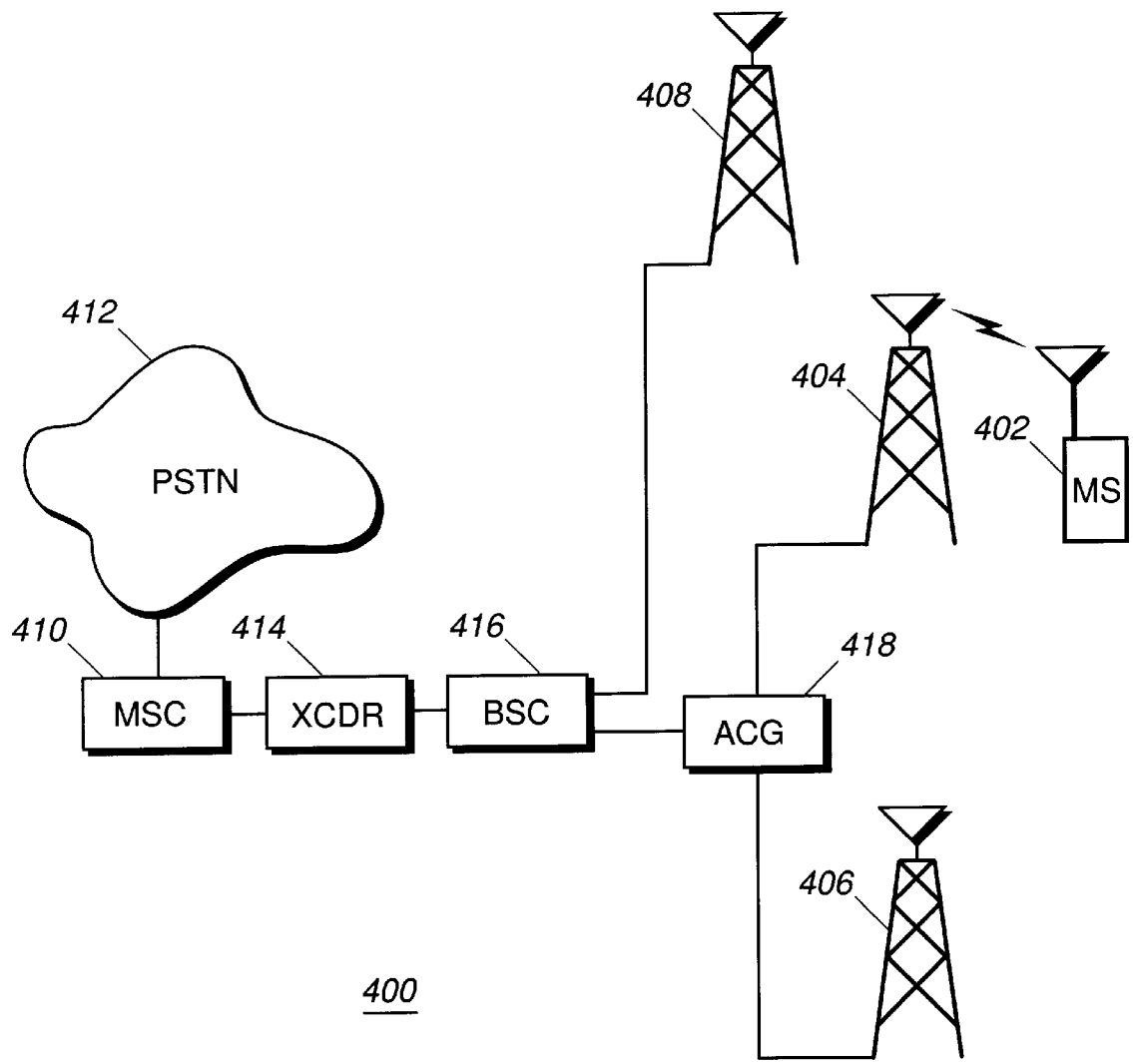
FIG. 4 shows a block diagram of a mobile communication system capable of practicing the present method invention.

FIG. 4 shows a block diagram 400 of a communication system for practicing the present invention. A mobile station or mobile communication device 402 is initially located in one of a plurality of serving cells, such as that established by a first base station 404. The mobile communication device engages a communication service from the first serving cell, and then may move into the vicinity of a second base station 406 or a third base station 408, either of which would constitute a second serving cell. If the communication device 402 is engaged in a communication session, meaning it is transmitting audio information, receiving audio information, or both, the air interface link will be handed off to the second serving cell when the communication device is near enough to a different base station, as is conventional in the art.

A communication session, such as a telephone call, is processed by a communication agent such as a mobile switching center (MSC) 410. In the case of cellular telephony, the MSC processes calls between mobile devices and between mobile devices and the public switched telephone network (PSTN) 412. Between the communication agent and the base stations are typically several types of equipment, including a transcoder (XCDR) 414, a base site controller (BSC) 416, and possibly an access control gateway 418.

The transcoder is a device that converts standard telephony pulse code modulated data into voice encoded data, and vice-versa. A voice signal coming in from the PSTN bound for a mobile user comes into the mobile network through the MSC, gets converted by the transcoder, sent to the appropriate BSC where it is routed to the appropriate base station. In some instances, there may be more than one base station on a site, and the ACG is used on site to control data flow between base stations. The XCDR has an error mitigation function in it which is invoked whenever unusable data is received during a call.

While it has been discussed that a user of a mobile communications device will, with prior art equipment, have a received signal muted during handover, which interrupts the audio signal heard by the user, it is also true that if the user is speaking, the listening party, which may be a PSTN user or another mobile user, will hear the effect of a handover mute. To remedy this problem, the present invention can be applied to the fixed network equipment as in the mobile communication device.

Since the XCDR contains an error mitigation function, it is a logical place to perform the attenutate/send/repeat process for mitigating handover mutes. The muted segments will be treated as corrupted signals, thus resulting in a reduction of the perceptibility of the muted portion. Alternatively, the process could be performed at the MSC. The audio information is processed as a digitized audio signal at the MSC, as opposed to a voice encoded signal at the mobile communication device. Upon the occurrence of a handover for a given mobile communication device, the MSC will store a segment of the signal. At the MSC, the method to conceal the handover is to attenuate the segment, re-transmit, and repeat. This is equivalent to the attenuate, play, and repeat method for use in the mobile communication device since the play step is really just transmitting the attenuated segment to an audio circuit. Here, the MSC transmits the segment to the PSTN, or another mobile line.

Figure 5:
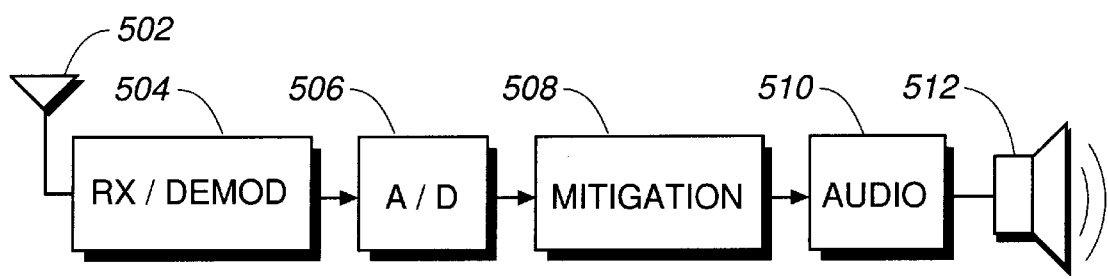
FIG. 5 shows a block diagram of an alternative implementation of a mobile communication device capable of practicing the invention.

FIG. 5 shows an alternative embodiment for using the present invention in an analog mobile system. That is, when the audio information is transmitted in analog form. Referring now to FIG. 5, there is shown a block diagram of a receiver line up 500 of a mobile communication device for receiving analog audio signal modulated onto an RF carrier. The RF signal is received at an antenna 502, and fed to an analog receiver/demodulator 504. The output of the receiver/demodulator is an analog audio signal, which is sampled and digitized by an analog to digital converter (A/D) 506. The A/D outputs a digitized audio signal to a mitigation component 508, which could be a DSP, or simply a microprocessor. Since the mobile communication device will have to tune to a new frequency to handover to a new serving cell, the time of the handover is known. Just prior to the handover occurring, the mitigation component will store suitable segment of the digitized audio signal, and perform the attenuate, play, repeat process as described hereinabove. The audio circuit 510 is substantially the same as that described in reference to FIG. 1, as is the speaker 512.

Thus, the invention provides a way of reducing the perceptibility of a handover event, which normally results in the listener hearing a momentarily muted period of speech. Since the listener is likely unaware of the handover event, hearing the voice of the speaking party drop out momentarily may be perceived as a problem with the system, or that it reflects some quality issue. The method takes advantage of the fact that the period of time the received signal is interrupted is very brief with respect to speech processing, and can use a segment or segments of speech received just prior to the handover to conceal the handover.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a communication system having a plurality of serving cells, including a first serving cell and a second serving cell, a method for concealing a handover of a communication service from the first serving cell to the second serving cell, comprising:

receiving a digitized audio signal;

storing a segment of the digitized audio signal;

during an occurrence of the handover:

reducing a magnitude of the segment of the digitized audio signal, to provide an attenuated segment;

playing the attenuated segment over an audio circuit; and repeating the reducing and playing until the handover is complete.

2. A method as defined in claim 1, wherein the method is performed by a mobile communication device.

3. A method as defined in claim 2, wherein the reducing, playing, and repeating are performed by an error mitigation function.

4. A method as defined in claim 1, wherein the receiving comprises receiving a digital audio signal comprising an encoded speech signal.

5. A method as defined in claim 1, wherein the method is performed by a fixed network equipment, and the receiving is performed by receiving the digitized audio signal from a mobile communication device while handing over the communication service from the first serving cell to the second serving cell.

* * * * *